US010274212B2

(12) United States Patent
Baelden et al.

(10) Patent No.: US 10,274,212 B2
(45) Date of Patent: Apr. 30, 2019

(54) COMBINED SYSTEMS FOR UTILIZATION OF WASTE HEAT

(71) Applicant: Tesla, Inc., Palo Alto, CA (US)

(72) Inventors: Camille Pierre Jean Baelden, Reno, NV (US); Kevin Cornelius Matthews, Reno, NV (US)

(73) Assignee: Tesla, Inc., Palo Alto, CA (US)

( * ) Notice: Subject to any disclaimer, the term of this patent is extended or adjusted under 35 U.S.C. 154(b) by 78 days.

(21) Appl. No.: 15/673,340

(22) Filed: Aug. 9, 2017

(65) Prior Publication Data
US 2018/0045423 A1   Feb. 15, 2018

Related U.S. Application Data

(60) Provisional application No. 62/373,298, filed on Aug. 10, 2016.

(51) Int. Cl.
*F24F 3/14* (2006.01)
*F24F 12/00* (2006.01)
(Continued)

(52) U.S. Cl.
CPC .......... *F24F 3/1429* (2013.01); *F24F 3/1411* (2013.01); *F24F 12/00* (2013.01);
(Continued)

(58) Field of Classification Search
CPC .......... F24F 3/1429; F24F 3/14; F24F 3/1423; F24F 3/1417; F24F 3/147; F24F 12/00;
(Continued)

(56) References Cited

U.S. PATENT DOCUMENTS

| 5,323,616 A | 6/1994 | Chretien et al. |
| 5,505,050 A | 4/1996 | Arriulou et al. |

(Continued)

FOREIGN PATENT DOCUMENTS

DE   19849116 A1   4/2000

OTHER PUBLICATIONS

Aneke, et al.; Potential for Improving the Energy Efficiency of Cryogenic Air Separation Unit (ASU) using Binary Heat Recovery Cycles; Applied Thermal Engineering; Feb. 2015; 18 pages.
(Continued)

*Primary Examiner* — Emmanuel Duke
(74) *Attorney, Agent, or Firm* — Garlick & Markison; Bruce E. Garlick

(57) ABSTRACT

A combined gas-compressor and dehumidifier system composed of a gas compressor for compressing a first gas, a dehumidifier for dehumidifying a second gas, and a cooling system. The gas compressor is composed of one or more compression stages and one or more intercoolers, wherein the one or more intercoolers are connected to a cooling system. The dehumidifier for dehumidifying a second gas is composed of a first dehumidifying stage that uses a first desiccant to adsorb water from the second gas and output a second intermediate gas, a second dehumidifying stage that uses a second desiccant to adsorb water from the second intermediate gas, and a waste heat exchanger, wherein the waste heat exchanger is used to reactivate the first desiccant. The cooling system is composed of a liquid contained in connectors, and the connectors connecting the one or more intercoolers to remove heat from the gas compressor and provide the removed heat to the dehumidifier.

20 Claims, 10 Drawing Sheets

(51) Int. Cl.
 *F24F 3/147* (2006.01)
 *B01J 20/34* (2006.01)
(52) U.S. Cl.
 CPC ........... *B01J 20/3483* (2013.01); *F24F 3/147* (2013.01); *F24F 2003/1458* (2013.01); *Y02P 80/156* (2015.11)
(58) Field of Classification Search
 CPC ... F24F 3/1411; F24F 2003/1458; F02C 6/16; F02C 7/143; F28D 7/0083; F25D 21/02; F25D 17/042; Y02P 80/156; B01J 20/3483
 See application file for complete search history.

(56) References Cited

U.S. PATENT DOCUMENTS

| | | |
|---|---|---|
| 5,921,106 A | 7/1999 | Girault et al. |
| 7,278,264 B2 | 10/2007 | Brostow |

OTHER PUBLICATIONS

Moskowitz; Compressed air systems' waste heat improves plant economics; Plant Services, May 4, 2011; <http://www.plantservices.com/articles/2011/05compressorheatrecovery/>; 6 pages.
CAGI Promotional Subcommittee; Heat Recovery from Industrial Compressed Air Systems; May 1, 2013; 4 pages.
U.S. Department of Energy; Heat Recovery with Compressed Air Systems, Compressed Air Systems Fact Sheet #10; May 25, 1999; 2 pages.
U.S. Department of Energy; Improving Compressed Air System Performance, a sourcebook for industry; Nov. 2003; 128 pages.

COMBINED SYSTEMS FOR UTILIZATION
OF WASTE HEAT

CROSS-REFERENCE TO RELATED
APPLICATION

The present application claims priority pursuant to 35 U.S.C. § 119(e) to U.S. Provisional Patent Application No. 62/373,298, entitled "COMBINED SYSTEMS FOR UTILIZATION OF WASTE HEAT," filed 10 Aug. 2016, which is incorporated herein by reference in its entirety and made part of the present application for all purposes.

TECHNICAL FIELD

The present disclosure relates generally to a combined system that includes at least one system that generates waste heat and at least one system that utilizes that heat in a process.

BACKGROUND

It is desirable to create an efficient industrial system to best utilize the waste from one industrial process as an input to another industrial process. It is an aim of the present disclosure to capture excess heat from one process and utilize that captured heat as part of another process. It is a further aim of the present disclosure to reduce overall energy usage or cost by creating a more efficient system by combining systems, such as gas-compressor and dehumidifier systems, to create efficiencies in the combined system, and/or reducing the amount of energy that must be purchased from an external source.

DETAILED DESCRIPTION

Figure 1A:
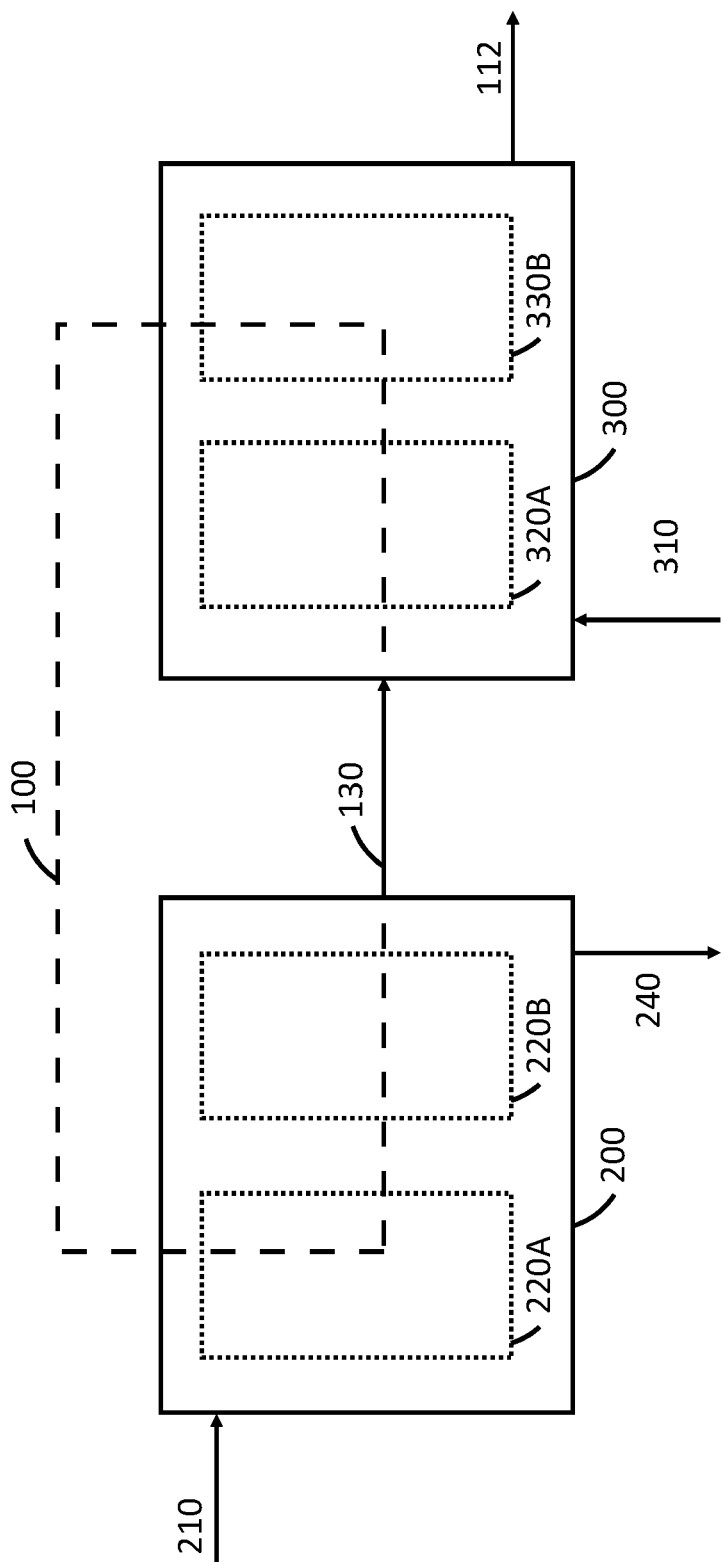
FIG. 1A is a schematic view of a combined system according to certain embodiments of the present invention.

A combined system that includes a cooling system that creates efficiencies is disclosed. The waste heat from one or more systems may be used as input to another system. In certain embodiments, the heat generated by a compression system may be used by a dehumidifier system to reactivate desiccant. By using the waste heat, fewer non-waste resources are needed by the dehumidifier and the combined compressor/dehumidifier system.

When a compression system is part of the combined system, the present invention allows for a lower holistic marginal cost for the generation of compressed air. Compressed air can be an important part of the manufacturing process, and the access to inexpensive compressed air (or compressed air produced at a lower marginal cost) according to the present disclosure allows additional uses that may otherwise be cost prohibitive. Compressed air can be used for many different industrial applications. The specific application of the compressed air is not important to the present disclosure.

The present disclosure also allows for the controlling of humidity in an industrial operating environment at a reduced marginal cost (which on an absolute scale may be a low cost), by utilizing waste heat. Reference to "low cost" herein, refers to a reduced marginal cost that may be low on an absolute scale. The present disclosure allows for the protection of moisture-sensitive materials by reducing the moisture content in the air, utilizing waste heat, at least in part, to reactivate desiccants used in the dehumidification process. Moisture control is important to ensure that high-quality products may be produced. In certain embodiments, the dehumidification configuration is intended to operate in low-humidity environments, that is environments with water vapor not exceeding 500 ppm.

An advantage of the present disclosure is the production of reduced-marginal-cost compressed air due to the utilization of the waste heat byproduct. As a result of the low cost of compressed air production, it may be advantageous to utilize compressed air to cool a space and/or as a source of dry air to a space. The previously mentioned embodiment is focused on synergies between a compressor plant and a dehumidification plant. Certain embodiments combine compressed air and dehumidification in one system and the combined system may be utilized to provide mechanical work to tools (typically actuating air cylinders) and/or use the compressed air to supply cooling and drying to a space. Using compressed air for HVAC make-up air has several key advantages. Compressed air has a higher density than ambient air, so smaller cross section area conveyance (piping or ducting) can be utilized to provide the same amount of cooling. The use of piping or ducting according to certain embodiments of the present disclosure saves volumetric space and cost in a production facility over traditional ducting that can become very large in manufacturing facilities. Utilizing compressed air for both tool actuation as well as clean and dry air supply to a space also simplifies construction which should result in a shorter construction time line.

Another advantage of certain embodiments of the present disclosure is that large air-handling units with fans and filters found in traditional HVAC systems are eliminated. The higher air density also enables compressed air to be stored much more effectively than traditional room air, that is stored in a smaller volume and with lower insulation costs. Using certain embodiments of the present disclosure allows a building to optimize its energy usage by adding a new storage component to reduce the impact of load variations. Another advantage of certain embodiments of the present disclosure is that a mass of moisture can be removed more effectively from a compressed air stream compared to an air stream near ambient pressures. Increasing the pressure of a gas isothermally increases the relative humidity which enables moisture to be removed more readily. A smaller dehumidification desiccant vessel may also be used in which energy can be more readily recovered because the regeneration stream is not vented.

A system according to certain embodiments provides sensible cooling and moisture removal to a space by either 1) cooling and drying the air prior to distribution, 2) keeping the air separated from the space and allowing it to expand (reduce in pressure) through an air-to-air heat exchanger, such that during the expansion the air will absorb heat from the space and effectively cool it, 3) expand the air through a vortex tube and vent the hot air portion outside the conditioned space, 4) utilize compressed air to regenerate a desiccant. In the case of cooling and drying the air prior to distribution, the space has an exhaust line and/or leakage so that pressure doesn't build and so that energy and moisture can leave the space, or 5) exchanging air-to-water heat after gas expansion to provide useful cooling. Because embodiments of the invention allow for compressed air to be generated at lower costs, compressed air may be used in many ways that were traditionally cost prohibitive in other production facilities.

FIG. 1A is a schematic view of a combined system according to certain embodiments of the present invention. Gas enters into compressor 200 through inlet 210. In certain embodiments, gas is air from outside of a building, typically at ambient temperature. For example, gas may be air from outside of the factory housing the combined gas-compressor/dehumidifier system. The air may be preferentially drawn from an area outside of the building that receives shade or otherwise receives less sunlight so as to be cooler than other areas outside of the building. In certain embodiments, outside air is drawn during evening hours when the sun is not shining or at a time of day that is typically cooler, such as at dawn or sunset. In other embodiments, gas is air from inside a building. In other embodiments, gas is from an exhaust system or from a compressed gas cylinder for further compressing.

Compressor 200 compresses gas through a series of one or more stages. During the compression process, heat is generated. This heat is typically exchanged through a compressor heat exchanger or an intercooler. The heat is exchanged through the compressor heat exchanger or intercooler to air or gas that is part of a cooling system.

A gas compressor can be cooled using air (or another gas, such as nitrogen) or water (or another liquid). As part of the cooling process, heat is transferred to the air or water, increasing the temperature of the air or water used to cool the air compressor. For larger systems, the use of water is often more effective since the specific heat of water is greater than the specific heat of air. Regardless of whether air or water is used to cool the air compressor, the heat that is contained in the air or water is not used elsewhere in the typical system and is therefore waste heat. When water is used, the water containing the waste heat may be termed heated water.

There are typically two types of water-cooling systems to cool air compressors: open-loop and closed-loop. Open-loop cooling typically uses a water source. In open-loop cooling the water may be discharged to the sewer, environment, or another source. The water used in open-loop typically not treated, so scale buildup may occur. To prevent buildup, chemicals may need to be added repeatedly to keep the dissolved minerals dissolved or suspended in the water and not form as solids in the system. The compressor heat exchanger may also be corroded by the untreated water or chemicals added to keep the dissolved materials from solidifying. Buildup due to untreated water or corrosion may result in a shorter life cycle and increased maintenance costs of the gas-compressor system compared to closed-loop systems, in which water may be treated to alleviate issues from buildup and corrosion.

Closed-loop cooling can also be used to cool a gas-compressor system. Like, open-loop cooling, water may also be used as the heat-exchange medium. Closed-loop cooling can be advantageous over open-loop cooling by reducing the maintenance issues described above for open-loop cooling. In closed-loop cooling, after initial setup, the system may require little or no ongoing water treatment. Initial setup may include the addition of an ethylene or propylene glycol mixture with corrosion inhibitors to the water. Another advantage of a closed-loop system is that transporting the heated water to other, distant locations within a manufacturing plant, may be easier and more efficient.

There are at least four types of closed-loop cooling: (1) water to water heat exchange; (2) water to water heat exchange with trim evaporative cooling (outside closed loop); (3) water-evaporative cooling (outside closed loop); and (4) water to air heat exchange.

In certain embodiments that use water as the heat-exchange medium, hot water is generated. The hot water is transferred to the staged dehumidifier 300 using connector 130. Connector 130 is part of cooling system 100. In certain embodiments, the hot water transferred to the staged dehumidifier 300 using connector 130 is between 80-95° C.

In certain embodiments, cooling system 100 consists of one loop, or one major loop. In other embodiments, cooling system 100 consists of multiple loops that are interconnected. In certain embodiments, different loops are connected with a heat exchanger or intercooler.

As explained in additional detail below, gas enters through inlet 210 and is then subjected to a series of compression stages 220A and 220B that results in compressed gas exiting through outlet 240. The gas compression also generates hot water or heated water that is part of cooling system 100. Hot water may be transferred to the dehumidifier 300 using connector 130 and used in the dehumidifying process. In certain embodiments, connector 130 is part of a hydronic loop.

Connector 130 connects the dehumidifier 300 with the compressor 200. Hot water may be transferred using connector 130. The hot water transferred using connector 130 can be considered waste heat (or heated water) from the compressor 200 since the heat stored in the hot water typically does not have another use in the gas-compression process. To reuse the hot water as in the gas-compression process, it must typically be cooled to remove the heat generated.

In certain embodiments, the waste heat that was transferred to the dehumidifier 300 may be used by the dehumidifier 300 as part of the process of dehumidifying gas. As shown in FIG. 1A, gas enters into dehumidifier 300 through inlet 310. Gas may be air from outside of a building, especially in dry environments. When the gas is outside air, it is typically captured at ambient temperature. For example, gas may be air from outside of the factory housing the combined gas-compressor/dehumidifier systems. The air may be preferentially drawn from an area outside of the building that is sunnier or drier than other areas outside of the building. For example, outside air may be drawn during daylight, and in particular afternoon hours, when the sun is shining the brightest. Alternatively, gas may be air drawn from inside a building. For example, the gas (or a portion of the gas) inlet to the dehumidifier is gas that has been returned from a dry room.

Figure 3A:
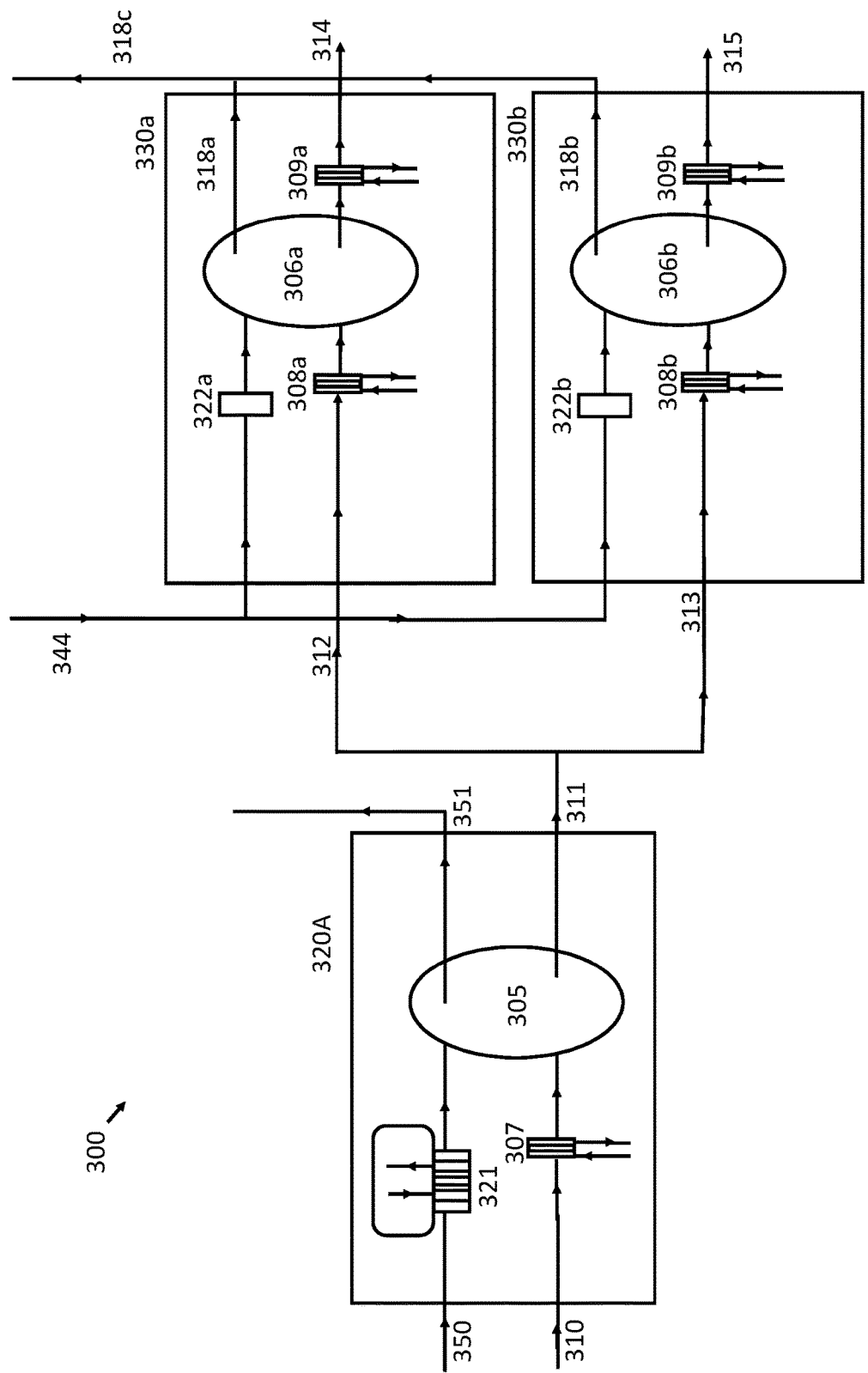
FIG. 3A is a schematic view illustrating a dehumidifier for removing moisture from a gas according to certain embodiments of the present invention.

Dehumidifier 300 dehumidifies gas from inlet 310 through one or more stages. In certain embodiments, as described in more detail below, a two-stage dehumidification system may be used. Gas from inlet 310 is sent to a first dehumidification stage 320A that uses a first desiccant 305 to remove water from gas. The first dehumidification stage 320A may be a coarse dehumidification stage in which a desiccant is used that does not have the adsorption properties to remove all of the water desired (that is to dehumidify to the desired level) from gas. A desiccant with greater adsorption properties may be used in the second dehumidification stage 320B to dehumidify gas to an acceptable level. In certain embodiments, the desiccant used is selected to maximize moisture removal at the temperature of the hot water transmitted using connector 130. In certain embodiments, a less expensive desiccant may be used in stage one and a more expensive desiccant may be used in a second dehumidification stage 320B, as illustrated in FIG. 3A as 330a/330b. In certain embodiments, the desiccant used is the first dehumidification stage 320A is a silica gel.

After first dehumidification stage 320A removes moisture from gas, the gas passes to second dehumidification stage 320B where the second dehumidification stage 320B removes additional moisture before the gas leaves the dehumidifier 300 through outlet 112. The desiccant used in the second dehumidification stage 320B may have better adsorption properties to remove additional moisture from the gas after the first dehumidification stage 320A removed moisture. For example, the desiccant used in the second dehumidification stage 320B may be a molecular sieve.

In one aspect of the current disclosure, the desiccants used may be commercially available desiccants or they may be non-commercially available desiccants. Examples of desiccants include clay, silica gel, indicating silica gel, molecular sieve, calcium oxide, calcium sulfate, and other adsorbents. Desiccants can be classified by their ability to adsorb moisture, rate of adsorption, capacity for water, and adsorptive capacity at elevated temperatures. Depending on the specific operating conditions, the appropriate desiccant may be chosen. For example, in a specific embodiment, in the case of a two-stage dehumidification system, the first desiccant can be chosen to be a less-expensive and/or less energy-intensive desiccant that does not adsorb moisture as well as a more expensive desiccant.

Figure 1B:
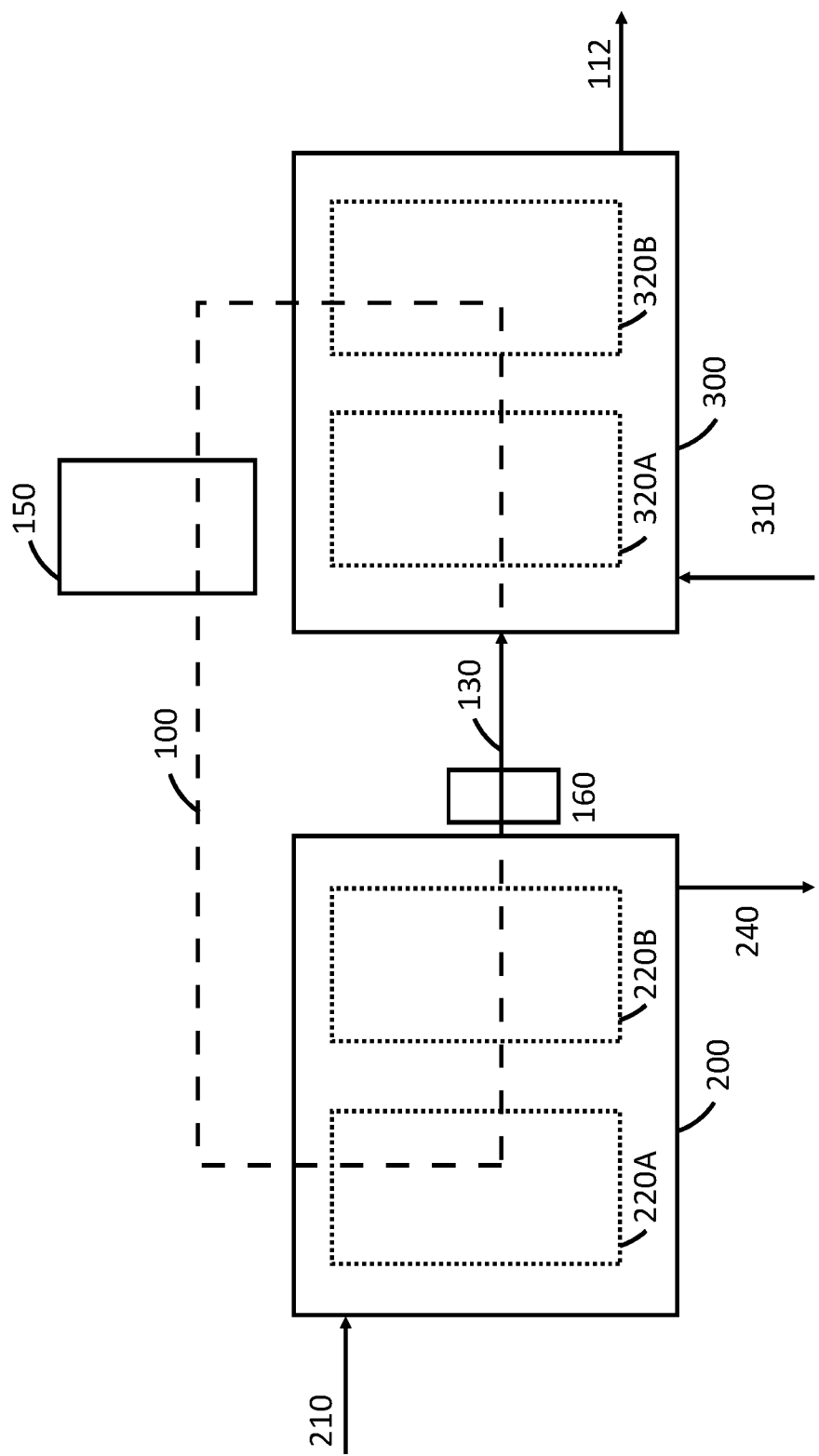
FIG. 1B is a schematic view of a combined system according to certain embodiments of the present invention.

FIG. 1B is a schematic view of a combined system according to certain embodiments of the present invention. Additional systems are connected to cooling system 100. FIG. 1B shows systems 150 and 160 that are additional heat producing systems or heat consuming systems. One or more systems may be attached to connector 130. These systems may be in series with compressor 200 and dehumidifier 300. Alternatively, these systems may be in parallel with compressor 200 and dehumidifier 300. In certain embodiments, fewer than two additional heat-producing or heat-consuming systems are connected to cooling system 100. In certain embodiments, more than two additional heat-producing or heat-consuming systems are connected to cooling system 100.

In certain embodiments system 150 or system 160 is a solar-array system comprising one or more solar thermal cells and/or photovoltaic thermal hybrid solar collectors. In certain embodiments, the solar cells generate waste heat carried by cooling system 100. In other embodiments, the solar cells consume heat carried by the cooling system. Controlling the temperature of the solar cells increases efficiency of the solar cells since solar cells and the electronics that carry generated current are sensitive to temperature fluctuations. In certain embodiments, solar-array system comprises batteries or other energy storage devices.

In certain embodiments system 150 or system 160 is a system to heat oil for use in different machinery. System 150 or system 160 may also be an anode bake oven or furnace or a cathode bake oven or furnace. Further, system 150 or system 160 may be an oven for use to bake off solvent as part of a solution casting process. System 150 or system 160 may be used as part of a lithium ion battery manufacturing process, which may involve, mixing, coating, compressing, drying, and assembly. Cooling system 100 may be used as the heat source for one or more of these processes. In certain embodiments, cooling system 100 may be another liquid besides water, or water containing additives, such as ethylene glycol, as the heat exchange medium.

In certain embodiments, heat generating systems are placed physically near heat consuming systems. The heat generating systems are placed near heat consuming systems to best match the temperature of the waste air or water produced by the heat generating system and the temperature of the air or water required for use by the heat consuming system. In certain embodiments, one or more heat generating systems produces heated air or water that is within 5 degrees C. of the temperature required by the heat consuming system. In certain embodiments, the entire production facility may be physically arranged to optimize the distance between heat generating system and heat consuming systems in order to most efficiently utilize generated waste heat.

Figure 1C:
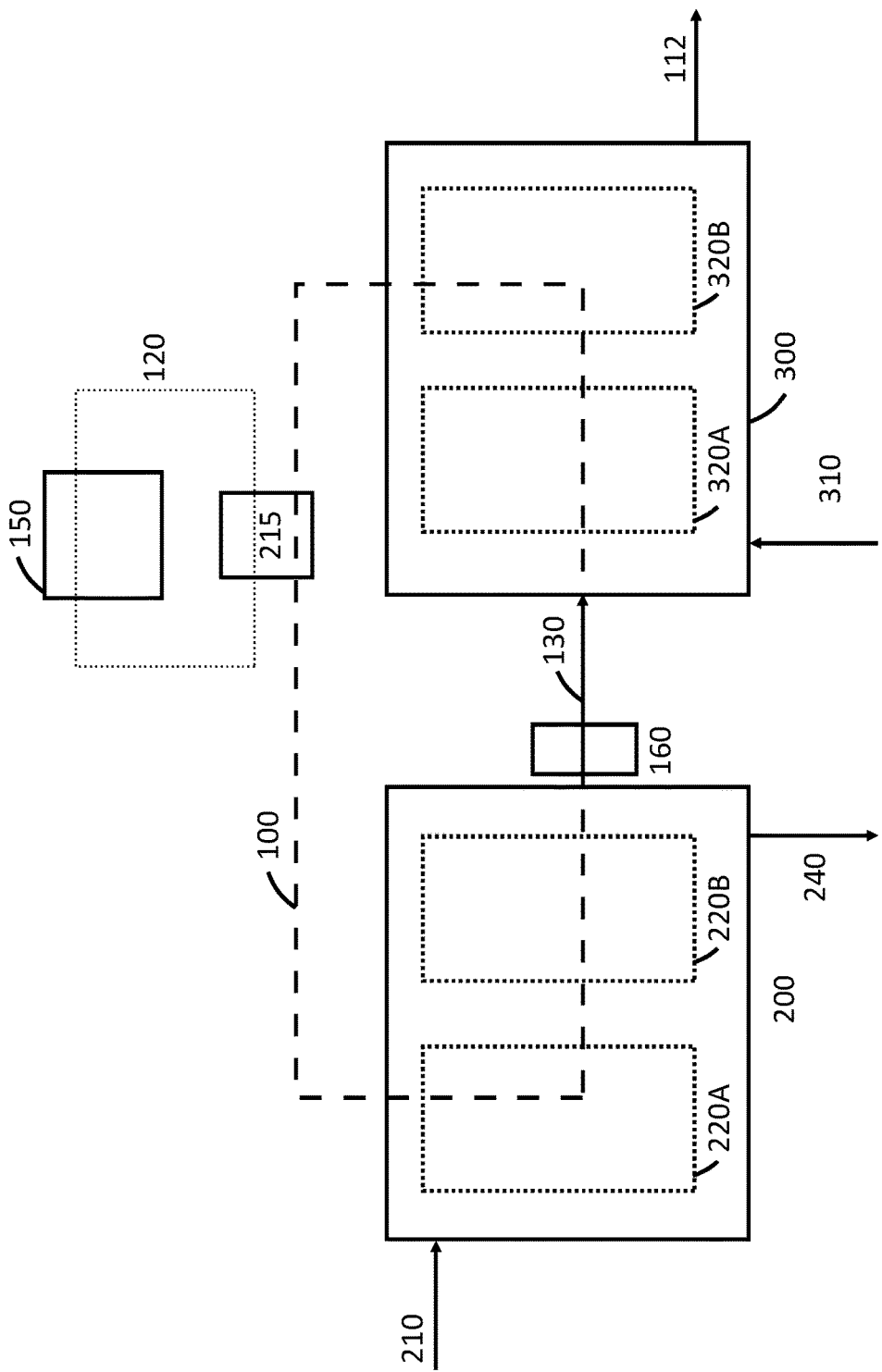
FIG. 1C is a schematic view of a combined system according to certain embodiments of the present invention.

FIG. 1C is a schematic view of a combined system according to certain embodiments of the present invention. In FIG. 1C, a second loop 120 is connected to the main loop through heat exchanger or intercooler 215. All are part of cooling system 100. Second loop 120 is connected to system 150. System 150 may generate heat or consume heat. In certain embodiments, system 150 comprises one or more heat pumps. In certain embodiments, second loop 120 may operate at a different temperature than the main loop. In certain embodiments, cooling system 100 comprises additional loops.

Figure 2A:
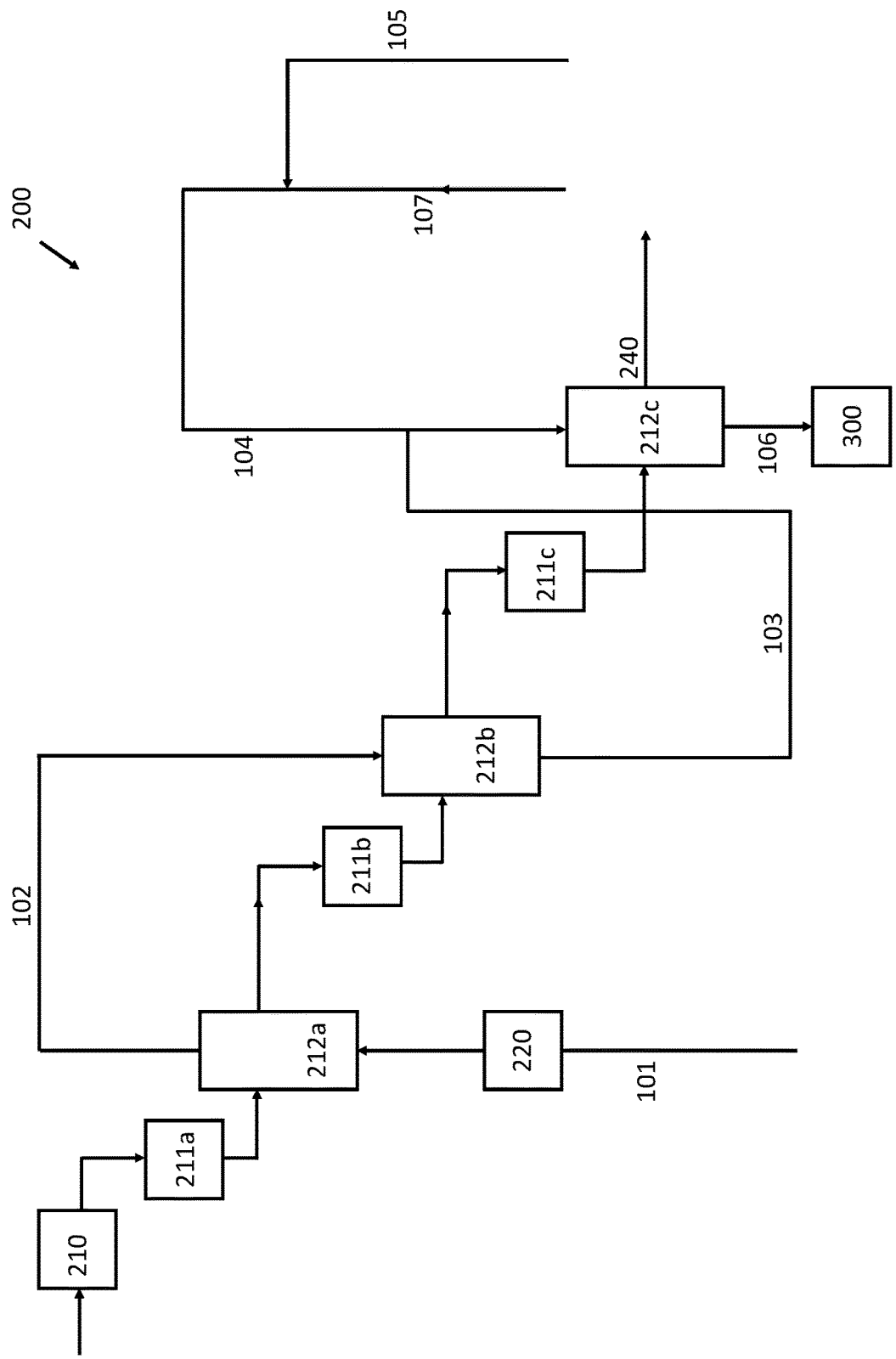
FIG. 2A is a schematic view illustrating a compressor for compressing gas according to certain embodiments of the present invention.

FIG. 2A is a schematic view illustrating an embodiment of a compressor for compressing gas according to certain embodiments of the present invention. In certain embodiments, compressor 200 comprises fewer than three compression stages. In certain embodiments, compressor 200 comprises more than three compression stages.

As illustrated in FIG. 2A, gas enters compressor 200 through inlet 210. Gas may be outside air or inside air taken from a specific portion of an industrial complex. Gas enters the first compression stage 211a. The first compression stage 211a compresses the gas. After exiting the first compression stage, the gas is at a higher pressure and temperature. The gas flows to the compressor heat exchanger or intercooler 212a. Liquid also flows to the compressor heat exchanger or intercooler 212a. The liquid may be water with additives, such as inhibitors intended to prevent the corrosion. The compressor heat exchanger or intercooler 212a facilitates transfer of heat from the compressed gas to the liquid contained in element 101. In certain embodiments, the initial temperature (prior to any heat exchange with an intercooler) of the liquid contained in element 101 is greater than ambient temperature. For example, the initial temperature (prior to any heat exchange with an intercooler) of the liquid contained in element 101 may be above 35° C.

In certain embodiments, heat rejection exchanger 220 reduces the temperature of the liquid contained in element 101. This can be done to ensure that the temperature of the liquid is at the necessary or the most efficient temperature for use in the heat exchanger or intercooler 212a.

After heat transfer facilitated by the compressor heat exchanger or intercooler 212a, the compressed gas has a lower temperature, but maintains the same pressure as it had after exiting first compression stage 211a.

Elements 101, 102, 103, 104, 105, 106, and 107 are part of cooling system 100 and contain air or liquid to help dissipate heat. In certain embodiments, the elements contain water or a mixture of water and an additive, such as ethylene glycol. Elements 101, 102, 103, 104, 105, 106, and 107 may form a hydronic loop and may be pipes or tubes. In certain embodiments, elements 101, 102, 103, 104, 105, 106, and 107 are configured in a serpentine manner to connect the compressor heat exchanger or intercooler (212a, 212b, 212c). In certain embodiments, elements 101, 102, 103, 104, 105, 106, and 107 connect the intercoolers in series to obtain a desired outlet temperature. For certain industrial applications, the desired outlet temperature is between 80-95° C. The compressor heat exchanger or intercooler 212a need not be connected in series, and would understand that other configurations of elements 101, 102, 103, 104, 105, 106, and 107 (including more or fewer) could be used, to implement the invention.

After each compression stage (211a, 211b, 211c), the gas exits at a higher temperature and pressure than it did entering the compression stage. The cooling system 100, including elements 101, 102, 103, 104, 105, 106, and 107 contains liquid that is used as a heat sink to accept heat from the compressed gas facilitated by the compressor heat exchangers or intercoolers (212a, 212b, and 212c). Chilled water 105 may be added to the warmer water within cooling system 100 as necessary to produce the desired outlet temperature. For example, chilled water may be added at one or more points of cooling system 100 to ensure the proper temperature at different points in the loop, depending on the needs of specific systems and/or components within a system. In certain embodiments, chilled water is added to cooling system 100 to condense water out of a compressed air stream. The chilled water may be used as part of a process to remove condensed water through a compressed air dryer. In certain embodiments, chilled water is used to control compressed air outlet temperature. In other embodiments, chilled water is used to control inlet water temperature.

In certain embodiments, after the gas exits the final compression stage (compression stage 211c in FIG. 2A) and/or final heat exchanger or intercooler (heat exchanger or intercooler 212c in FIG. 2A), the gas enters a heat of compression (HOC) dryer before being routed to the building or other system. The HOC dryer may be a heat exchanger or intercooler that is connected to the cooling system 100. An additional heat exchanger or intercooler may also exist to further reduce the temperature of the air and removes moisture from the system. Connecting the HOC dryer's heat exchanger or intercooler to cooling system 100 allows for recovery of heat from the HOC dryer. This creates additional efficiency gains by utilizing heat from the HOC dryer that would otherwise not be used.

In certain embodiments, the compressed gas is stored for later usage. The compressed gas may be stored in gas cylinders or other suitable vessel for compressed-gas storage. A suitable vessel has enough integrity to contain the compressed gas and may contain safety or pressure valves, one or more rupture disks, or one or more fusible plugs. The gas may be compressed at times during the day that are most efficient for gas compression and the compressed gas may be used at different times during the day.

In the embodiment shown in FIG. 2A, element 106 contains the outlet water that is transferred to the dehumidifier 300. In certain embodiments, chilled water 105 may be higher than is typical, for example increasing the temperature of the chilled water 105 from below 10° C. to above 10° C. Such a reduction has the benefit of reducing operating costs.

In certain embodiments, the compressor heat exchanger or intercooler 212a is a shell-and-tube-type intercooler. In further embodiments, the intercooler is optimized to maximize water temperature rise. This optimization may take into account the specific heat of the water (or liquid) used in cooling system 100, the type of material used for the intercooler, and the thermal conductivity of the material. In certain embodiments, the intercooler is made, at least in part, of a metal. In certain embodiments, the intercooler is optimized, at least in part, by increasing the tube and fin density. In other embodiments, the intercooler is optimized, at least in part, by utilizing a counter-flow configuration. In other embodiments, the intercooler is optimized, at least in part, by utilizing a cross-flow orientation.

In certain embodiments, the temperature of the liquid within cooling system 100 may actually be greater than temperature that would allow the compressor, operating alone, to operate most efficiently. For example, the temperature of the liquid contained in element 101, may be between 35-45° C. Heat exchange at the compressor heat exchanger or intercooler 212a would typically be more efficient at a lower temperature, such as at 10° C. However, the efficiency lost by not using a liquid cooled to a lower initial temperature in cooling system 100 to cool the gas in the compressor may be gained back in the dehumidification process.

In certain embodiments, the intercoolers may be reconfigured by one or more of the following: providing a counter flow, decreasing the tube diameter (cross sectional area), increasing the fin density, and providing multiple intercoolers in series with one another). These reconfigurations allow heat from the compressed gas stream to be recovered at a high temperature, between 80-95° C.). A two-step dehumidification system may be used to maximize moisture removal with a reactivation (rotor drying) temperature of 80-95° C. (the temperature of heated water containing the waste heat). This reduces the use of higher temperature (150° C. and above), higher-cost heating (such as gas or electrical heating) required to bring air to the low humidity concentration required.

Figure 2B:
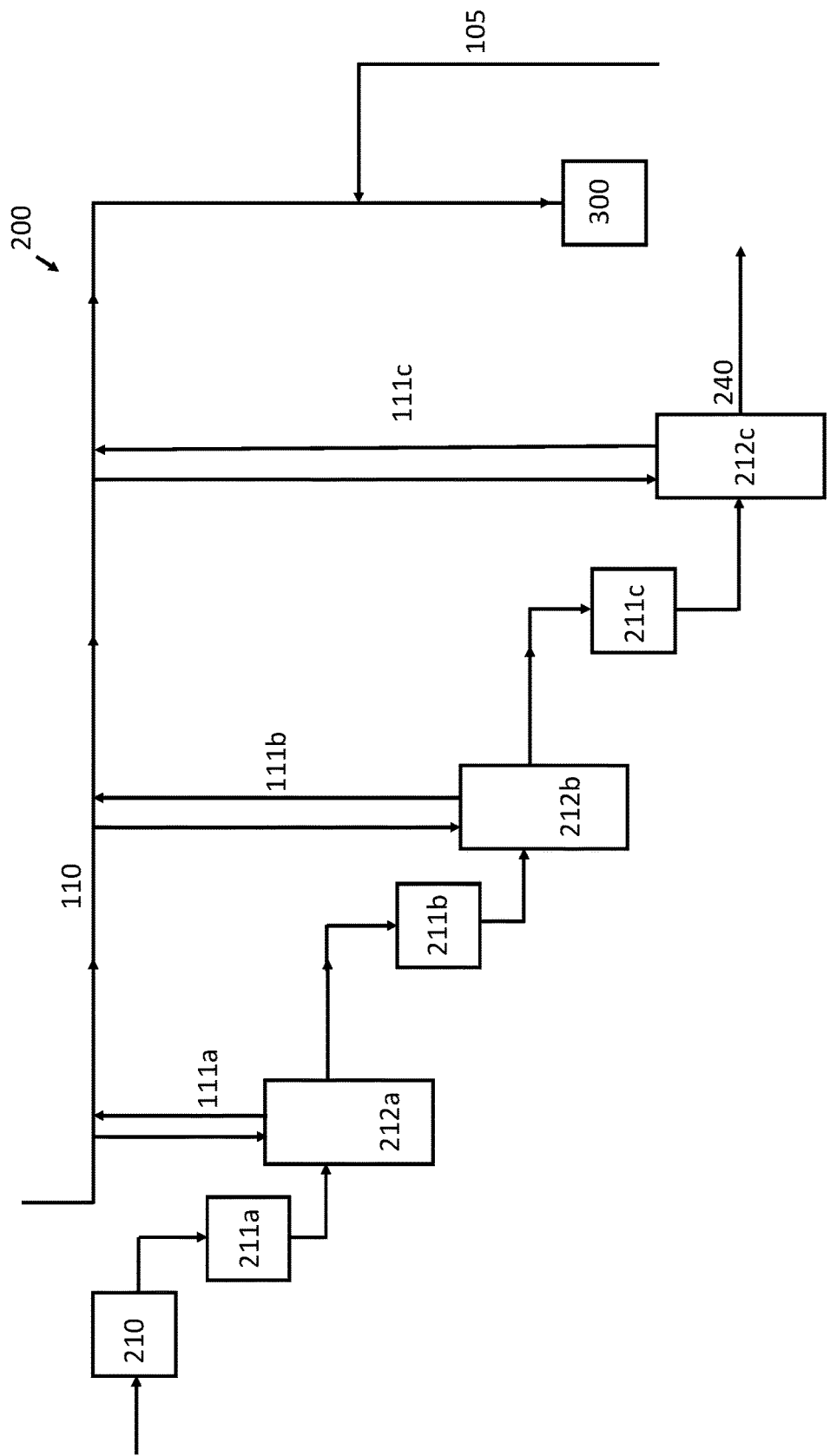
FIG. 2B is a schematic view illustrating a compressor for compressing gas according to certain embodiments of the present invention.

FIG. 2B is a schematic view illustrating an embodiment of a compressor for compressing gas according to certain embodiments of the present invention. FIG. 2B illustrates the cooling system with a backbone and reverse, or counter, flow to each of the heat exchangers or intercoolers 212a-c. In certain embodiments, compressor 200 comprises fewer than three compression stages. In other embodiments, compressor 200 comprises more than three compression stages.

As illustrated in FIG. 2B, gas enters compressor 200 through inlet 210. Gas may be outside air. In some embodiments, inlet 210 includes an intercooler. The intercooler may be connected to element 110, which is part of the backbone. Cooling is desirable because compressors require a lower specific energy to compress air when it is at a lower temperature. When cooling is inexpensive (such as by storing cooled liquid cooled during a cool night, which often occurs in dry, arid regions) including an intercooler in inlet 210 allows for the compressor to consume less energy and can lead to overall cost savings during the gas-compression process.

After leaving inlet 201, gas enters the first compression stage 211a. The first compression stage 211a compresses the gas. After exiting the first compression stage, the gas is at a higher pressure and temperature. The gas flows to the compressor heat exchanger or intercooler 212a. Liquid also flows to the compressor heat exchanger or intercooler 212a. In certain embodiments, the liquid may be water with additives, such as inhibitors intended to prevent the corrosion. The compressor heat exchanger or intercooler 212a facilitates transfer of heat from the compressed gas to the liquid contained in element 110. In certain embodiments, the initial temperature (prior to any heat exchange with an intercooler) of the liquid contained in element 110 is greater than ambient temperature. In certain embodiments, the initial temperature (prior to any heat exchange with an intercooler) of the liquid contained in element 110 is above 35° C.

After heat transfer facilitated by the compressor heat exchanger or intercooler 212a, the compressed gas has a lower temperature, but roughly maintains the same pressure as it had after exiting first compression stage 211a.

In certain embodiments, the compressed gas is stored for later usage. The compressed gas may be stored in gas cylinders or other suitable vessel for compressed-gas storage. A suitable vessel has enough integrity to contain the compressed gas and may contain safety or pressure valves, one or more rupture disks, or one or more fusible plugs. The gas may be compressed at times during the day that are most efficient for gas compression and the compressed gas may be used at different times during the day.

Elements 110, 111a, 111b, and 111c are part of cooling system 100 and contain air or liquid to help dissipate heat. In certain embodiments, the elements contain water or water with an additive, such as ethylene glycol. Elements 110, 111a, 111b, and 111c are part of a hydronic loop and may be pipes or tubes. As shown in FIG. 2b, element 110 is part of the backbone of the cooling system. Elements 111a, 111b, and 111c branch from element 110 to connect the compressor heat exchanger or intercoolers. In certain embodiments, the desired outlet temperature is between 80-95° C.

After each compression stage (211a, 211b, 211c), the gas exits at a higher temperature and pressure than it did entering the compression stage. In certain embodiments, the cooling system 100, including elements 110, 111a, 111b, and 111c contains liquid that is used as a heat sink to accept heat from the compressed gas facilitated by the compressor heat exchangers or intercoolers (212a, 212b, and 212c). In FIG. 2B, the intercoolers are all arranged in series and preferentially have high heat transfer coefficients that enable small temperature differences and thus low loss of the quality of heat or exergy destruction.

After exiting outlet 240, the gas may be sent to a bypass value. The bypass value allows for the gas to be routed to the heat recovery exchangers, which allows the heat recovery based on composition of the air stream to be maximized. It also allows the control of the desiccant reactivation flow rate (increase heat recovery, reduced pressure drop (less air going through the drier).

Chilled water 105 may be added to the warmer water within cooling system 100 as necessary to produce the desired outlet temperature. The outlet water that is transferred to the dehumidifier 300. In certain embodiments, chilled water 105 is higher than is typical, for example increasing the temperature of the chilled water 105 from below 10° C. to above 10° C. Such a reduction has the benefit of reducing operating costs. Chilled water may be added at one or more points of cooling system 100 to ensure the proper temperature at different points in the loop, depending on the needs of specific systems and/or components within a system. Chilled water may also be added to cooling system 100 to condense water out of a compressed air stream. The chilled water may be used as part of a process to remove condensed water through a compressed air dryer. In certain embodiments, chilled water is used to control compressed air outlet temperature. In other embodiments, chilled water is used to control inlet water temperature.

In certain embodiments, after the gas exits the final compression stage (compression stage 211c in FIG. 2B) and/or final heat exchanger or intercooler (heat exchanger or intercooler 212c in FIG. 2B), the gas enters a heat of compression (HOC) dryer before being routed to the building or other system. In certain embodiments, the HOC dryer comprises a heat exchanger or intercooler that is connected to the cooling system 100. An additional heat exchanger or intercooler may also exist to further reduce the temperature of the air and removes moisture from the gas. Connecting the HOC dryer's heat exchanger or intercooler to cooling system 100 allows for recovery of heat from the HOC dryer. This creates additional efficiency gains by utilizing heat from the HOC dryer that would otherwise not be used.

In another embodiment, a high-pressure compressor recovers heat at higher temperature, typically in excess of 500° C. The high-pressure compressor utilizes significantly less cooling that the embodiments shown in FIGS. 2A and 2B. The high-pressure compressor may use no intercooling at all and is preferentially an axial compressor, although it may be other types. The high-pressure compressor typically produces air at a pressure greater than 11V1 Pa and a temperature greater than 500° C. (and potentially as high as 700° C.). After each compression stage, or alternatively after the compression is complete, the air may be cooled by rejecting heat to a very high temperature sink (such as a molten salt system). The cooled very high-pressure air can then be moved around the building in very small piping since it is at high pressure. The high-pressure air can then be expanded in a turbine (removing work from the system and causing cooling) or in a vortex tube to create cooling.

Figure 2C:
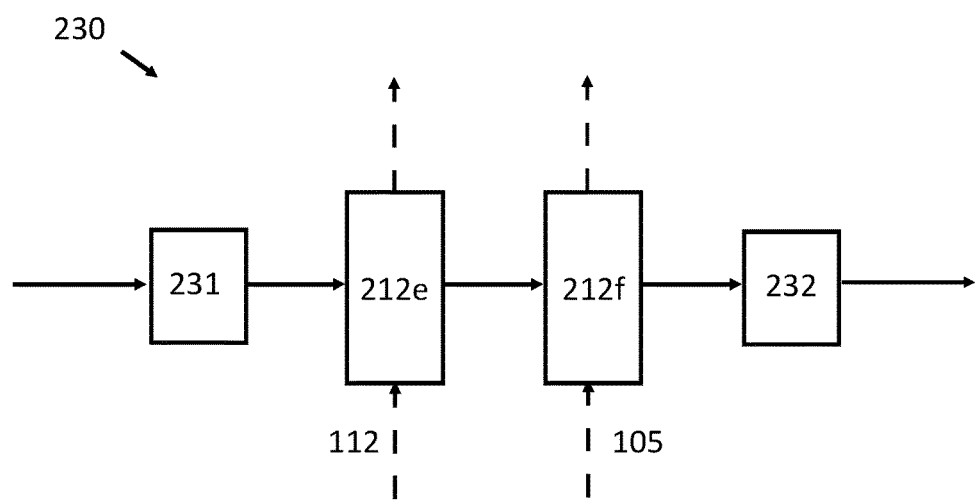
FIG. 2C is a schematic view illustrating a heat of compression dryer according to certain embodiments of the present invention.

FIG. 2C is a schematic view illustrating an embodiment of a heat of compression dryer according to certain embodiments of the present invention. As shown in FIG. 2C, HOC dryer 230 is comprised of regeneration tower 231, heat exchanger or intercooler 212e, heat exchanger or intercooler 212f, and drying tower 232. Gas is incident on regeneration tower 231. The HOC dryer according to certain embodiments of the present invention has advantages over traditional dryers, which use dryer valves to redirect the air or gas stream and reverse the placement of the regeneration tower and drying tower.

The gas to the HOC dryer as shown in FIG. 2C is from the final compression stage of a compression system as described above. This compressed gas is sent to regeneration tower 231 then to heat exchanger or intercooler 212e. Heat exchanger or intercooler 212e is connected to cooling system 100 through element 112. Heat exchanger or intercooler 212e allows for recovery of heat from the HOC dryer and return of the heat to cooling system 100. Heat exchanger or intercooler 212e also reduces the temperature of the air and removes moisture from the gas. After the gas exits heat exchanger or intercooler 212e, it enters heat exchanger or intercooler 212f. Heat exchanger or intercooler 212f is connected to chilled water 105 and further reduces the temperature of the air and removes moisture from the gas. After the gas exits heat exchanger or intercooler 212*f* it can be sent to the building, another system, or stored for later use, such as for an HVAC system.

Additional heat exchanges or intercoolers may be added between different elements. For example, a heat exchanger or intercooler may be added between elements 112 and 105 of the cooling system. This additional heat exchanger or intercooler allows for increased recovery of heat at an elevated temperature. Further, in specific embodiments, the flow of gas may be reversed such that the gas flows from drying tower 232 to regeneration tower 231. That is the flow of the gas is incident on drying tower 232 then proceeds to heat exchangers or intercoolers 212*e* and 212*f* and then to regeneration 231. This change may be accomplished by altering valves (not shown in FIG. 2C) that reverse the gas flow.

In other embodiments multiple drying towers are included, either in series or in parallel. When multiple towers are included in parallel, values may tune the flow to the drying towers. Using multiple drying towers (with associated desiccant) allows for sizing of more average moisture loading and the ability to tune the amount of heat produced. For example, when heat is prevalent within the system, more heat may be used to dry (desorb adsorbed vapor) the desiccant in the drying towers. At a later time, when demands change, the flow of the gas may be reduced or stopped completely until there is no additional drying capacity from the desiccants. The ability to alter the gas flow to and from the drying towers may be accomplished by valves placed before the drying towers. Being able to alter the amount of gas to the drying towers (and provide differing amounts of drying) allows for another tunable parameter to deal with increased heating requirements, such as by use of other industrial processes or increased humidity and/or temperature of the gas from the gas inlet.

In certain embodiments, the compressor heat exchangers or intercoolers may be a shell-and-tube-type intercooler. In further embodiments, the intercooler is optimized to maximize water temperature rise. Such optimization may take into account the specific heat of the water (or liquid) used in cooling system 100, the type of material used for the intercooler, and the thermal conductivity of the material. In certain embodiments, the intercooler is made, at least in part, of a metal. In certain embodiments, the intercooler is optimized, at least in part, by increasing the tube and fin density. In other embodiments, the intercooler is optimized, at least in part, by switching to a counter-flow configuration relating to a lower outlet temperature. In other embodiments, the intercooler is optimized, at least in part, by utilizing a cross-flow orientation.

In certain embodiments, the temperature of the liquid within cooling system 100 may actually be greater than temperature that would allow the compressor, operating alone, to operate most efficiently. For example, the temperature of the liquid contained in element 101, may be between 35-45° C. Heat exchange at the compressor heat exchanger or intercooler 212*a* would typically be more efficient at a lower temperature, such as at 10° C. However, the efficiency lost by not using a liquid cooled to a lower initial temperature in cooling system 100 to cool the gas in the compressor may be gained back in the dehumidification process.

At times, up to thirty percent of the input energy remains in the air stream after the exit from the air-compressing process.

In certain embodiments, the intercoolers may be reconfigured by one or more of the following: providing a counter flow, increasing the tube height, increasing the fin density, and providing multiple intercoolers in series with one another). These reconfigurations allow heat from the compressed gas stream to be recovered at a high temperature, between 80-95° C.). A two-step dehumidification system may be used to maximize moisture removal with a reactivation (rotor drying) temperature of 80-95° C. (the temperature of heated water containing the waste heat). This reduces the use of higher temperature (150° C. and above), higher-cost heating (such as gas or electrical heating) required to bring air to the low humidity concentration required.

In certain embodiments, two or more heat exchangers or intercoolers are arranged in parallel rather than series. These heat exchangers or intercoolers have a large temperature rise on the water side. In certain embodiments, this temperature rise is achieved using a counter-flow or cross-flow orientation of the cooling elements. An advantage of this counter-flow or cross-flow orientation are efficiency gains by keeping the keeping air exit temperature from the heat exchangers or intercoolers low, which allows for more efficient air compression. Another advantage of this and other embodiments is that the heat exchangers and intercoolers can produce higher exit temperatures.

In certain embodiments, heat exchangers or intercoolers comprise small diameter tubes to allow for an increased fin density. The increase fin density allows for more efficient fin exchange. In certain embodiments, the tubes or fins are arranged in a turbulator or a rifling geometry.

In certain embodiments, it is advantageous to use a temperature under 80° C. to ensure to reduce the moisture loading on the desiccant as a part of the overall design of the cooling system and connected systems. Specific temperature choices are made to create efficiencies and energy cost savings for the system as a whole, not necessarily for one specific system that is connected to the cooling system. In certain embodiments, the design choice is to maximize recovery of high temperature heat not used in the dehumidification process. In certain embodiments, the design choice is to maximize the temperature of the air stream at the inlet or outlet.

The compressed gas can be used to provide mechanical work to tools (typically actuating air cylinders) and/or use the compressed air to supply cooling and drying to a space. Compressed gas can also be used in an expansion turbine. Expansion turbines allow the recovery of work put into compressing the gas while simultaneously producing cooling. However, it is important to avoid the frost point when utilizing expansion turbines. In certain embodiments, this is done by using dry air (less than 40% relative humidity), extremely dry air (less than 10% relative humidity), or by minimizing the pressure ratio.

Figure 5:
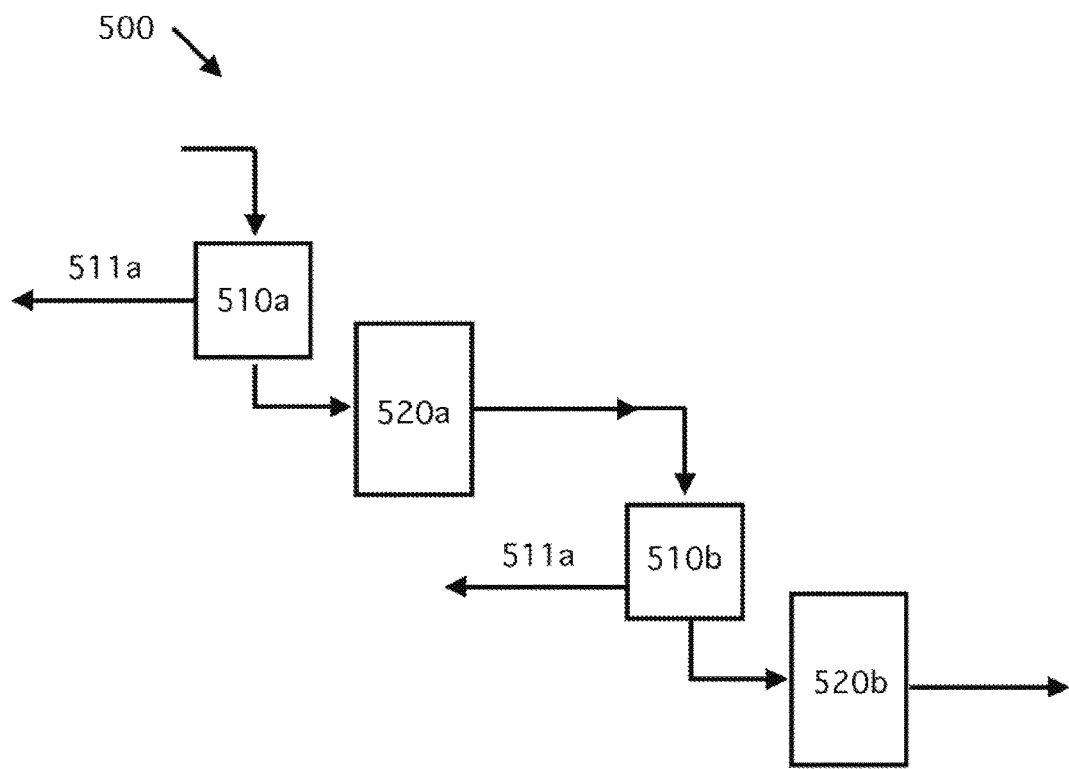
FIG. 5 is a schematic view of a work unit according to certain embodiments of the present invention.

Small decentralized units with one or more expansion turbine can be placed in areas that require mechanical work and cooling or in areas that require mechanical work and near other areas that require cooling. FIG. 5 shows work unit 500 with two expansion turbines 510*a* and 510*b* that produce useful work 511*a* and 511*b*. Gas enters work unit 500 and is incident on expansion turbine 510*a*, which allows expansion of the gas to produce work 511*a*. Gas is then passed to heat exchanger or intercooler 520*a*. Gas is then incident on expansion turbine 510*b*, which allows gas to expand and produces work 511*b*. Gas then proceeds to heat exchanger or intercooler 520*b* and then exits work unit at the desired gas pressure, typically the pressure required for units in the area. More or fewer expansion turbines may be used to produce the correct amount of work and/or desired pressure drop. More or fewer heat exchangers or intercoolers may also be used and one need not be used after every expansion turbine. In certain embodiments, the gas pressure entering work unit 500 is greater than 1 MPa.

Figure 3B:
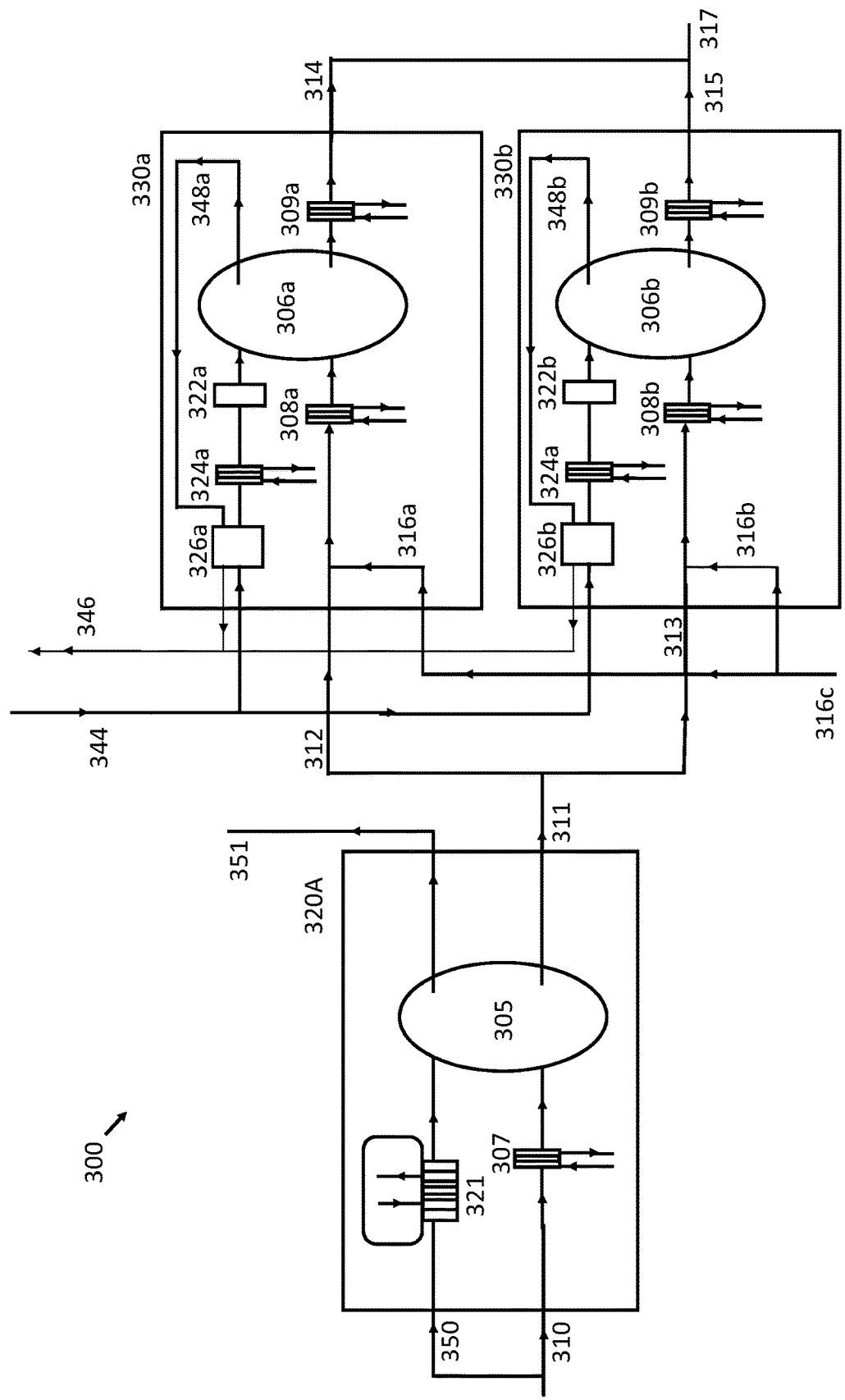
FIG. 3B is a schematic view of a dehumidifier for removing moisture from a gas according to certain embodiments of the present invention.

FIGS. 3A and 3B are schematic views illustrating different embodiments of a dehumidifier for removing moisture from a gas according to the present disclosure. In FIG. 3A, gas enters into the first dehumidification stage 320 through inlets 310 and 350. Gas that enters through inlet 310 is incident on precooler 307 and then desiccant 305. Gas that enters through 350 is incident on waste heat exchanger 321. In FIG. 3B, the same gas source enters both inlet 310 and inlet 350. That is, the same gas source is incident on waste heat exchanger 321 and precooler 307.

Gas may be air from outside of a building or from inside a specific area of an industrial complex. Gas may be outside air that is at ambient temperature. For example, gas may be air from outside of the factory housing the combined gas-compressor/dehumidifier system. The air may be preferentially drawn from an area outside of the building that is sunnier or drier than other areas outside of the building. In certain embodiments, a portion of the gas entering inlet 310 comprises air that is returned from a dry room. In certain embodiments, outside air may be drawn during daylight, and in particular afternoon hours, when the sun is shining the brightest. In other embodiments, gas is air from inside a building. In certain embodiments, air is drawn into the system during afternoon hours. Such air may be used as process air for reactivation of desiccant. In certain embodiments, air is drawn into the system during evening hours (after the sun has set). Such air may be used as an input or combined with other air to provide a cooler input to the dehumidifier.

The first dehumidification stage 320 dehumidifies the gas using a desiccant 305 and the gas exits the first stage through outlet 311. In certain embodiments, the gas is pre-treated only (not fully treated) since the gas passes through a second dehumidifier stage. After exiting the first dehumidification stage 320, the gas may enter one or more second dehumidification stages. If multiple dehumidification stages are present, they may be in series or parallel with one another. The use of multiple desiccants 305 and 306 (stored in desiccant vessels) can provide a thermal storage component, in which the latent heat of evaporation of water is stored. For example, providing three or more first dehumidification stages (each with desiccant stored in a desiccant vessel) allows for the latent heart of evaporation of water to be stored. Using multiple desiccant vessels also allows for sizing of more average moisture loading and the ability to tune the amount of heat produced. For example, when heat is prevalent within the system, more heat may be used to dry (desorb adsorbed vapor) the desiccant in the desiccant vessels. At a later time, when demands change, the flow of the gas may be reduced or stopped completely until there is no additional drying capacity from the desiccants. The ability to alter the gas flow to and from the desiccant vessels may be accomplished by valves placed before the desiccant vessels. Being able to alter the amount of gas to the desiccant vessels (and provide differing amounts of drying) allows for another tunable parameter to deal with increased heating requirements, such as by use of other industrial processes or increased humidity and/or temperature of the gas from the gas inlet.

FIGS. 3A and 3B illustrate two second dehumidification stages (330a and 330b) that are in parallel with one another. Gas enters the first of two second dehumidification stages 330a as gas 312. Desiccant 306a dries the gas, through for example, adsorbing moisture from the gas. The gas exits the second dehumidification stage 330a through outlet 314. The dehumidified gas may be sent to the desired location to control the humidity. The dehumidified gas may be transported to a dry room in which moisture-sensitive materials are used.

The gas enters the second of two dehumidification stages 330b as gas 313. Desiccant 306b dries the gas, through for example, adsorbing moisture from the gas. The gas exits the second dehumidification stage 330b through outlet 315. The dehumidified gas may be sent to the desired location to control the humidity. A person of ordinary skill will appreciate that dehumidified gas that exits the second dehumidification stages may be transported to the same location or different locations.

The gas that enters a second dehumidification stage may come directly from the first stage or may be mixed with other gas. FIG. 3B shows gas 316c mixing with the gas output by the first dehumidification stage. Gas 316c enters the second dehumidification stage 330a through inlet 316a and the second dehumidification stage 330b though inlet 316b, each time mixing with gas that was output from the first dehumidification stage 320. In certain embodiments, the gas max be mixed before entering the second dehumidification stages 330a and 330b.

In the second dehumidification stages, the gas may be chilled by precoolers (307, 308a, and 308b) prior to the desiccant (305, 306a, and 306b) removing moisture from the gas and/or cooling the desiccant rotors. The gas may also be heated using heaters 309a and 309b, situated after the gas has passed through the desiccant and before exiting through ports 314 and 315 (where it may be used in another industrial application).

Desiccants may be reactivated by using the waste heat using connector 130 shown in FIG. 1A to transfer the heat to the dehumidifier 300. FIGS. 3A and 3B illustrate waste heat exchanger 321 that is used to transfer waste heat to gas that is used to reactivate desiccant 305. In FIG. 3A, gas enters through inlet 350 before being incident on waste heat exchanger 321 and then desiccant 305, where is reactivates desiccant 305, before exiting through outlet 351. In FIG. 3B, the same gas that enters inlet 310 also enters inlet 350. That is, the same gas is incident on precooler 307 (before have moisture removed by desiccant 305) is also incident on waste heat exchanger 321 (before going to desiccant and removing adsorbed water vapor from the desiccant). Gas then exits through port 351. In another embodiment, differing gas may enter inlet 310 and inlet 350.

Gas may also be used to reactivate desiccant as shown in FIGS. 3A and 3B. In FIG. 3A, gas 344 may enter through inlets into second dehumidification stages (330a and 330b), then flow through heat exchangers 322a and/or 322b before reactivating desiccants 306a and 306b). The gas streams then exit the second dehumidification stages through outlets 318a and 318b after which they are combined in tubing 318c. Tubing may be formed from tube, duct, pipe, or any materials suitable for carrying gas.

In FIG. 3B, heating water heat exchangers (324a and 324b) are added to the second stage dehumidification stages (330a and 330b). The primary purpose of the heat exchanger is to lower the cost of heating gas 344 required to desorb desiccants 306a and 306b. Each heating water heat exchanger (324a and 324b) is located between a heat recuperator (326a and 326b respectively) and heat exchanger (322a and 322b respectively). The heat source for the heating water exchanger (324a and 324b) and connected heating loop may be a heat pump, a waste-heat stream, electrical heater, or another device that provides heat. Using a non-electric heat source like a waste-heat stream or a heat pump is economically desirable and may lower heating cost (compared to the use of electric heating) by one third or more. In certain embodiments, heaters 322a and 322b may be electric heaters for additional heat. In other embodiments, heaters 322a and 322b are not needed and can be removed.

Gas 344 (used to reactivate the desiccant) enters into a heat recuperator (326a or 326b), then moves to the heating water heat exchanger (324a or 324b), and subsequently to heat exchanger (322a or 322b) before impinging upon the desiccant (306a or 306b) to reactivate it. After exiting the desiccant, the gas (348a or 348b) has an increased humidity (or water vapor content) and is then passed back through the heat recuperator (326a or 326b) before exiting as reactivation exhaust 346.

The first and second dehumidification stages (320, 330a and 330b) are controlled to maximize the average fraction (over a certain period of time, such as throughout the course of a year) of heat provided by heat exchanger 324a since this heat may be provided directly from the gas-compression process (or other industrial process). For example, using certain industrial gas-compression processes related to battery and electric vehicle manufacturing, 50-70% of the heat needed to reactivate desiccants 306a and 306b can be provided by waste heat generated by the gas-compression process. The optimal desorption temperature depends on a variety of factors, including desiccant selection, the water adsorption rate, the ambient humidity, and other factors. For instance, as ambient humidity lowers the desorption temperature is minimized to maximize the fraction of reactivation heat provided by the heating water heat exchanger while maintaining the ability to meet specify humidity concentration for outlet gas stream 314 and 315. Preferentially, in relatively dry conditions with hot summers and cold winters, desorption temperature may range from 90° C. (lowest humidity) to 160° C. (peak humidity) with an annual average of 100° C.

The use of the waste heat, for example captured from the gas-compression process, is preferential to use of other heat sources, such as gas or electricity by decreasing the energy cost required for the combined compressor/dehumidification system. However, heat exchanger 322a and heat exchanger 322b may be electrical heat exchangers from non-waste heat sources if necessary. In certain embodiments, heat exchanger 322a and heat exchanger 322b may use electrical heat generated from a renewable source of energy. In other embodiments, a heat pump is used to add any additional heat into the system, such as adding heat to the liquid within the cooling system 100 at desired locations, such as at connector 130.

In certain embodiments, the first dehumidification stage 320 is a coarse dehumidification stage in which desiccant 305 is a desiccant that does not have the adsorption properties to remove all of the desired moisture (that is to dehumidify to the desired level). A desiccant with greater adsorption properties may be used in the second dehumidification stages (330a and 330b) to dehumidify gas to an acceptable level. The desiccant 305 may be selected to maximize moisture removal at the temperature of the waste heat transmitted using connector 130 and exchanged using waste heat exchanger 321. In certain embodiments, desiccant 305 is a less expensive desiccant than desiccant 306a and/or desiccant 306b. For example, desiccant 305 may be a silica gel and desiccants 306a and 306b may be molecular sieves.

Figure 4:
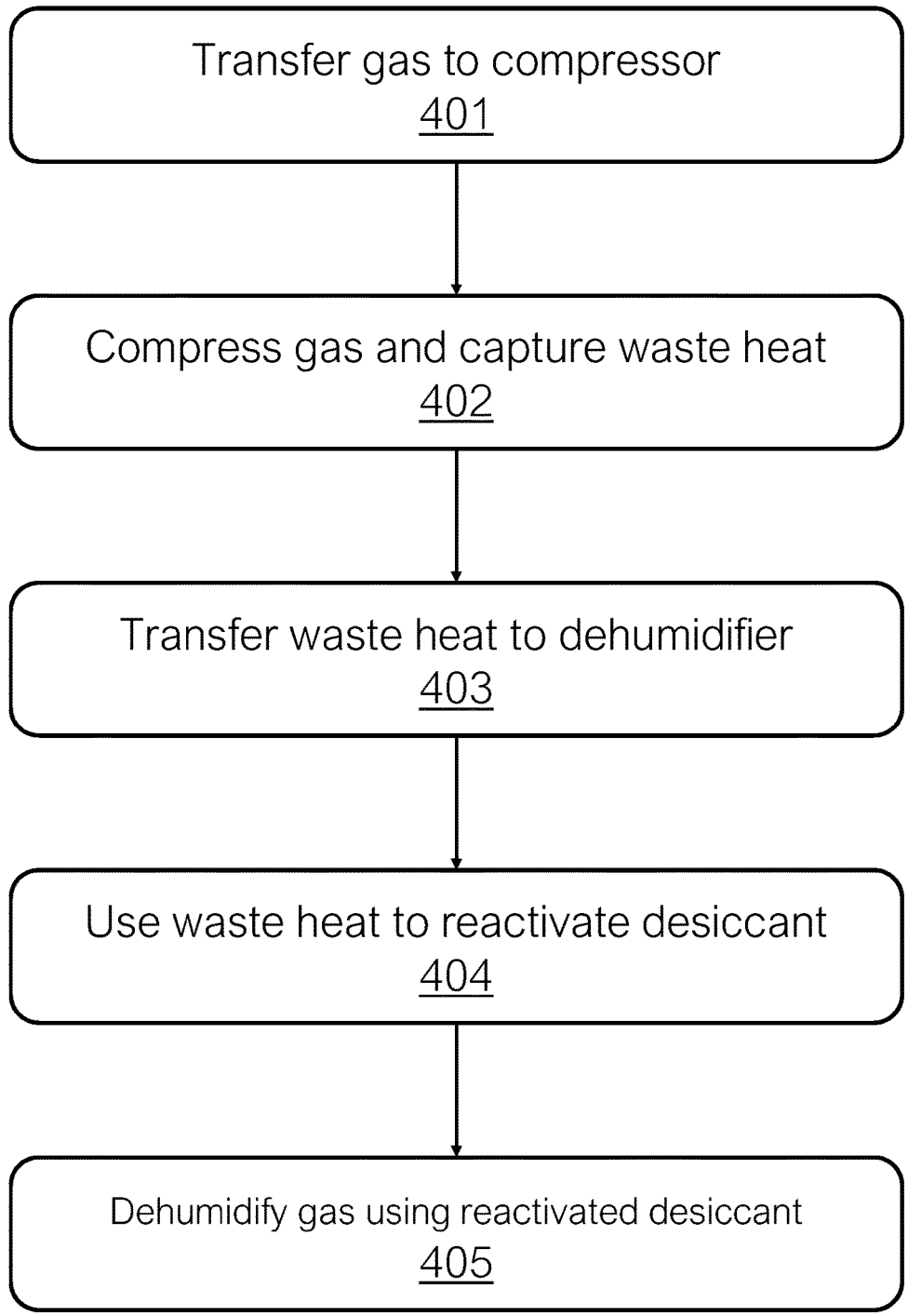
FIG. 4 illustrates a method of reusing waste heat generated from a gas-compression process during a dehumidification process according to certain embodiments of the present invention.

FIG. 4 illustrates a method of reusing waste heat generated from a gas compression process during a dehumidification process according to certain embodiments of the present invention. At step 401, gas is transferred to the compressor. In certain embodiments, gas is air from outside of a building. For example, gas may be outside air that is at ambient temperature. The air may be preferentially drawn from an area outside of the building that receives shade or otherwise receives less sunlight so as to be cooler than other areas outside of the building. In certain embodiments, outside air may be drawn during evening hours when the sun is not shining or at a time of day that is typically cooler, such as at dawn or sunset. In other embodiments, gas is air from inside a building. In other embodiments, gas is from an exhaust system or from a compressed gas cylinder for further compressing.

At step 402, the gas that was transferred to the compressor is compressed through a series of one or more stages. During the compression process, heat is generated. This heat is typically exchanged through a compressor heat exchanger or an intercooler. Using the compressor heat exchanger or intercooler, the heat generated in the compression process is exchanged through air or gas that is part of a cooling system, increasing the temperature of the air or water used to cool the air compressor. For larger systems, the use of water is often more effective. For example, the specific heat of water is greater than the specific heat of air. Regardless of whether air or water is used to cool the air compressor, the heat that is contained in the air or water is not used elsewhere in the typical system and is therefore waste heat. In certain embodiments, a closed-loop cooling system may be used. In certain embodiments, the closed-loop cooling system may include a hydronic loop.

At step 403, the waste heat is transferred to the dehumidifier portion of the system. The waste heat may be transferred using a closed-loop cooling system in which the waste heat increases the temperature of water or water with added impurities, such as ethylene glycol. In certain embodiments, the waste heat in the form of hot water may be transferred to the dehumidifier using pipes, tubes, or other elements of the cooling system.

At step 404, the waste heat is used to reactivate desiccant used as part of the dehumidification process. In certain embodiments, the reactivation occurs through the heating of air to an elevated temperature which then dries desiccant used in the dehumidification process. At step 405, the reactivated desiccant is used to dehumidify gas. In certain embodiments, the gas dehumidification may be a two-stage process and the reactivated desiccant may be used in one of both of those stages.

In one aspect of the current disclosure, the desiccants used may be commercially available desiccants or they may be non-commercially available desiccants. Examples of desiccants include clay, silica gel, indicating silica gel, molecular sieve, calcium oxide, calcium sulfate, and other adsorbents. Desiccants can be classified by their ability to adsorb moisture, rate of adsorption, capacity for water, and adsorptive capacity at elevated temperatures. Depending on the specific operating conditions, the appropriate desiccant may be chosen. For example, in a specific embodiment, in the case of a two-stage dehumidification system, the first desiccant can be chosen to be a less expensive and/or less-energy-intensive desiccant that does not adsorb moisture as well as a more expensive desiccant.

In certain embodiments, the present disclosure relates to the use of waste heat from a compressed air (or other gas) system to dry (and thereby reactivate) solid desiccant and minimize the operating cost of a dehumidification system. In certain embodiments, the solid desiccant may be a solid desiccant rotor. The dehumidification system may be a low dew-point dehumidification plant, in which the supply gas has an air dew point of less than at least 0° C., and may have a dew point of less than −50° C.

In certain embodiments, the compressor system uses an increased water exit temperature than is results in lower efficiency (or desirable) when considering the compressor system alone but higher overall efficiency of the combined compressor and dehumidification system. In certain embodiments, the two-stage dehumidification system allows gas to be dehumidified in two stages, using two different desiccants if desired, which allows different desiccants to be used that have different properties. This allows a desiccant to be selected that has a reactivation temperature similar to the temperature of the hot water that stores the waste heat. Together the compressor/dehumidifier system provides a significant symbiotic benefit that reduces electrical energy use or cost. This can help minimize the operating cost through lower utility usage or purchase.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on air compression and water cooling; however, different gases can be compressed and different liquids or gases can be use as part of the cooling system. Having thus described embodiments of the present disclosure, persons of ordinary skill in the art will recognize that changes may be made in form and detail without departing from the scope of the present disclosure. Also, the specification generally refers to combining systems, but a person of skill in the art will appreciate that when combined, each system may be referred to as a subsystem of the combined system. Thus, the present disclosure is limited only by the claims.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically specified.

The invention claimed is:

1. A combined gas-compressor and dehumidifier system comprising:
   a gas compressor for compressing a first gas, the gas compressor comprising:
      one or more compression stages;
      one or more intercoolers, wherein the one or more intercoolers are connected to a cooling system;
   a dehumidifier for dehumidifying a second gas, comprising:
      a first dehumidifying stage that uses a first desiccant to adsorb water from the second gas and output a second intermediate gas; and
      a second dehumidifying stage that uses a second desiccant to adsorb water from the second intermediate gas; and
      a waste heat exchanger, wherein the waste heat exchanger is used to reactivate the first desiccant and/or the second desiccant; and
   a cooling system, comprising:
      a liquid contained in connectors; and
      the connectors connecting the one or more intercoolers to remove heat from the gas compressor and provide the removed heat to the dehumidifier.

2. The combined gas-compressor and dehumidifier system of claim 1, wherein the combined gas-compressor and dehumidifier system provides air compression for mechanical work, sensible cooling, or moisture removal for space conditioning.

3. The combined gas-compressor and dehumidifier system of claim 2, wherein the combined gas-compressor and dehumidifier system is used to remove water vapor and the dehumidifier is conditioning an environment to a water vapor concentration of 500 ppm or less.

4. The combined gas-compressor and dehumidifier system of claim 1, further comprising a storage vessel for storing part of the compressed first gas.

5. The combined gas-compressor and dehumidifier system of claim 4, wherein the first gas is outside air drawn during afternoon or evening hours.

6. The combined gas-compressor and dehumidifier system of claim 1, wherein the connectors are connected to form a closed-loop system.

7. The combined gas-compressor and dehumidifier system of claim 1, further comprising a solar-array with one or more solar arrays that is connected to the cooling system through the connectors.

8. The combined gas-compressor and dehumidifier system of claim 7, wherein the solar-array further comprises an energy-storage device made of batteries, such that the cooling system is connected to remove or heat from energy-storage device.

9. The combined gas-compressor and dehumidifier system of claim 1, further comprising equipment to heat oil for use in machinery that is connected to the cooling system through connectors, such that the equipment used to heat oil is connected in series with gas-compressor and the dehumidifier.

10. The combined gas-compressor and dehumidifier system of claim 1, wherein the equipment to heat the oil is connected to the cooling system after the gas compressor such that at least some heat generated from the gas compressor is provided to the equipment for use to heat the oil.

11. The combined gas-compressor and dehumidifier system of claim 1, wherein the liquid is a mixture of water and ethylene glycol.

12. The combined gas-compressor and dehumidifier system of claim 1, wherein the connectors form first and second cooling loops, such that the first and second cooling loops operate at different temperatures.

13. A method of using waste heat in a combined gas-compressor and dehumidifier system comprising:
    compressing a first gas by a gas compressor that has one or more compression stages, and one or more intercoolers, wherein the one or more intercoolers are connected to a cooling system;
    capturing heat generated during compressing the first gas;
    transferring the compressed first gas to an industrial application or to storage tanks;
    sending the captured heat to a dehumidifier that has first and second dehumidifying stages, each stage containing a desiccant;
    within the dehumidifier, dehumidifying a second gas; and
    using a waste heat exchanger, removing vapor that was adsorbed by the desiccant.

14. The method of claim 13, further comprising the step of using the compressed first gas for mechanical work, sensible cooling, or moisture removal for space conditioning.

15. The method of claim 14, wherein the combined gas-compression and dehumidifier system is used to remove water vapor and the dehumidifier is operated in an environment that has a water vapor concentration of 500 ppm or less.

16. The method of claim 13, further comprising the step of storing part of the compressed first gas in a storage container.

17. The method of claim 13, wherein the first gas is drawn from outside air during afternoon or evening hours.

18. The method of claim 13, further comprising capturing heat generated from a solar-array or battery storage and using an intercooler.

19. A combined gas-compressor and dehumidifier system comprising:
    a module for compressing a first gas, the module having one or more compression stages; and one or more intercoolers conned connected to a cooling loop;
    a module for dehumidifying a second gas, the module having first dehumidifying stage with a desiccant to adsorb water vapor from the second gas and a second dehumidifying stage with a desiccant to adsorb water vapor from the second gas, the module also having a waste heat exchanger used to reactive the first desiccant; and
    a module capable of removing and providing heat to the module for compressing a first gas and the module for dehumidifying a second gas, the module having one or more loops containing liquid.

20. The combined gas-compressor and dehumidifier system of claim 19, further comprising a solar-array and an energy-storage device made of batteries, such that the module for removing and providing heat also is capable of removing heat from or providing heat to the solar-array or energy-storage device.

* * * * *